Figure 1:
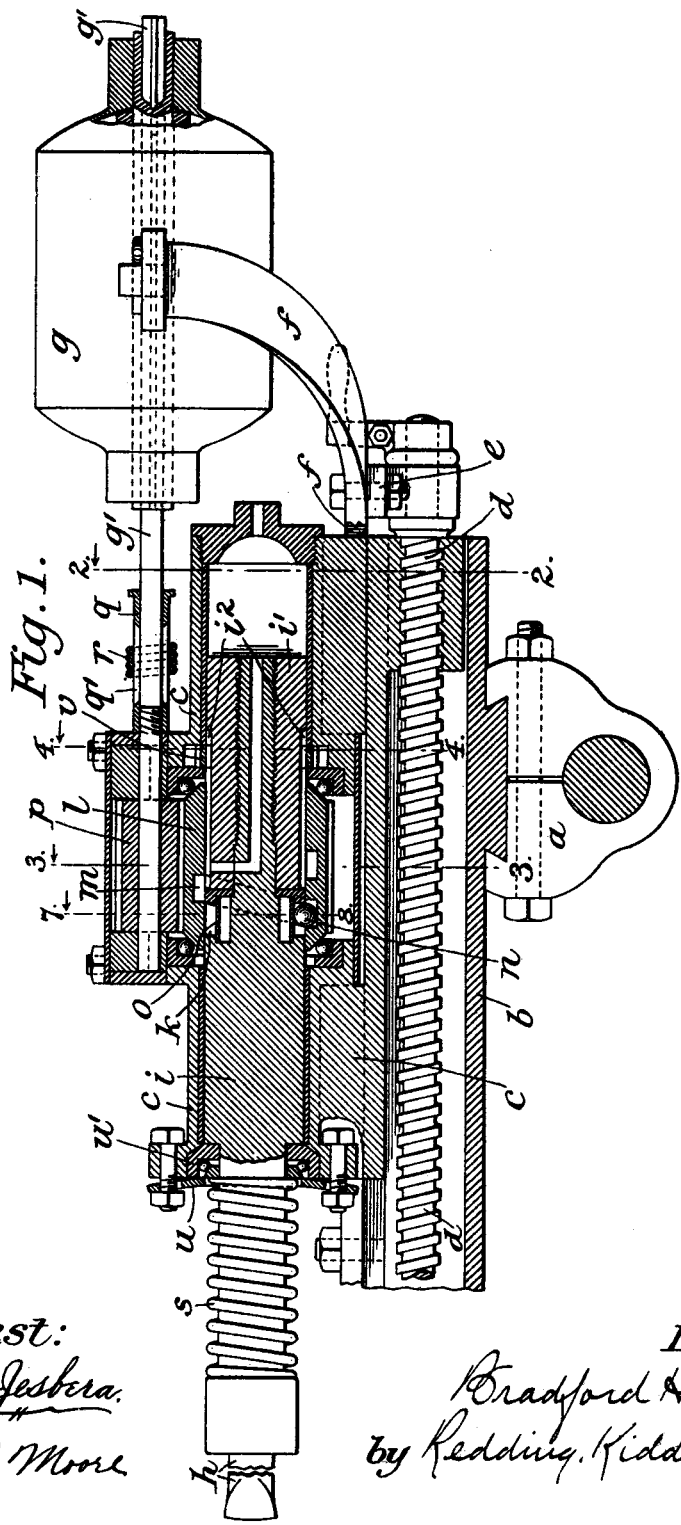

No. 676,045. Patented June 11, 1901.
B. H. LOCKE.
PERCUSSION DRILL.
(Application filed Mar. 2, 1900.)

(No Model.) 4 Sheets—Sheet 2.

Attest:
A. N. Jesbera
L. R. Moore

Inventor:
Bradford H. Locke
by Redding, Kiddle & Greeley
Attys.

No. 676,045. Patented June 11, 1901.
B. H. LOCKE.
PERCUSSION DRILL.
(Application filed Mar. 2, 1900.)
(No Model.) 4 Sheets—Sheet 3.

Attest:
A. N. Jesbera
L. R. Moore

Inventor:
Bradford H. Locke
by Redding, Kiddle & Greeley
Attys.

No. 676,045. Patented June 11, 1901.
B. H. LOCKE.
PERCUSSION DRILL.
(Application filed Mar. 2, 1900.)
(No Model.) 4 Sheets—Sheet 4.

Attest:
A. N. Jesbera
L. R. Moore

Inventor:
Bradford H. Locke
by Redding, Kiddle & Greeley
Attys.

THE NORRIS PETERS CO., PHOTO-LITHO., WASHINGTON, D. C.

UNITED STATES PATENT OFFICE.

BRADFORD H. LOCKE, OF DENVER, COLORADO.

PERCUSSION-DRILL.

SPECIFICATION forming part of Letters Patent No. 676,045, dated June 11, 1901.

Application filed March 2, 1900. Serial No. 7,071. (No model.)

*To all whom it may concern:*

Be it known that I, BRADFORD H. LOCKE, a citizen of the United States, residing in Denver, county of Arapahoe, State of Colorado, have invented certain new and useful Improvements in Percussion-Drills, &c., of which the following is a specification, reference being had to the accompanying drawings, forming a part hereof.

This invention relates to percussion-drills and other machines of like general character in which the shaft or stem or spindle or other part which carries or actuates the tool is reciprocated more or less rapidly, the movement in one direction being in the nature of a blow and produced by some suitable impelling force—such as gravity, a spring, air, steam, or gas under pressure, or some other force suited to the conditions of use—while the movement in the other direction may be and preferably is of a different character.

The invention is particularly concerned with the means for effecting the required reciprocations of the shaft or other part, and more especially with the means for effecting the movement of such shaft or other part in one direction in opposition to the impelling force which occasions the forward movement, and for releasing such shaft or other part at the end of its backward movement to be acted upon by such impelling force, the two forces which act upon the shaft or other part to effect its movement in opposite directions being independent the one of the other.

The object of the invention is to produce a machine of the general character referred to which can be operated successfully by an electric motor or by any other form of rotary motor which may be most convenient, and, further, to produce such a machine that shall possess great efficiency, shall be capable of long continued use without requiring repair or renewal of parts, shall be comparatively simple in construction, and shall not be too heavy to be transported easily from place to place, as the conditions of its use may require.

The invention will be more fully described hereinafter with reference to the accompanying drawings, in which for purposes of illustration and explanation it is represented as embodied in a convenient and practical form adapted for use as a mine or quarry drill with various modifications of that part with which the invention is particularly concerned.

Figure 2:
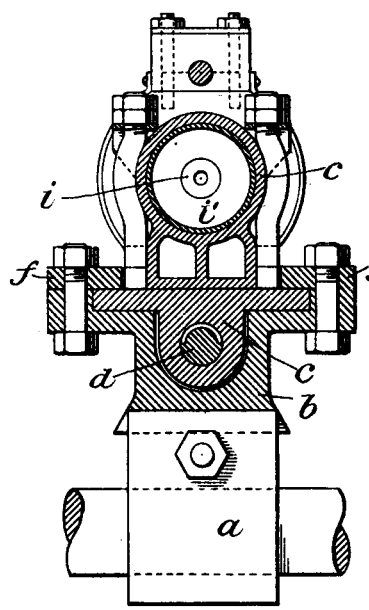
Figure 3:
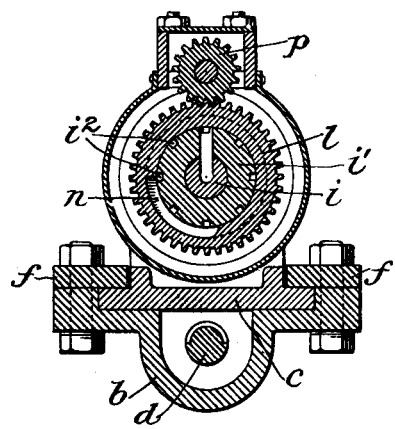
Figure 4:
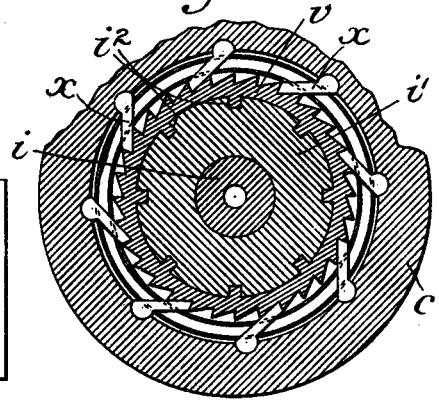
Figure 6:
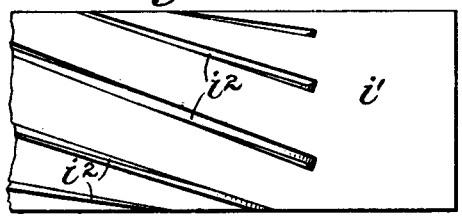
Figure 7:
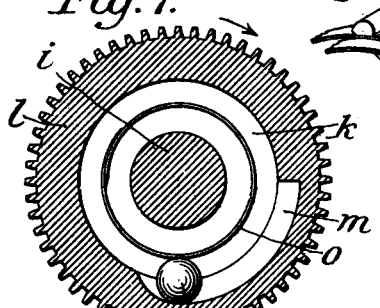
Figure 5:
Figure 8:
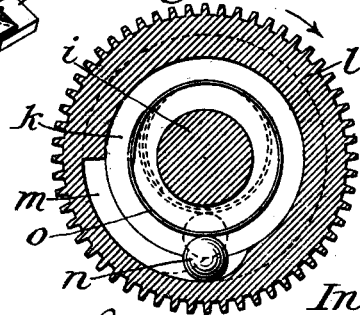
Figure 9:
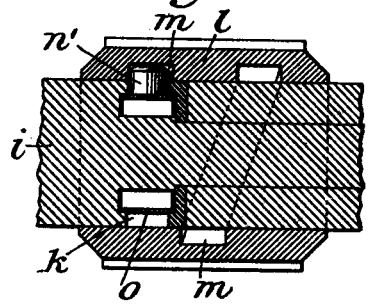
Figure 10:
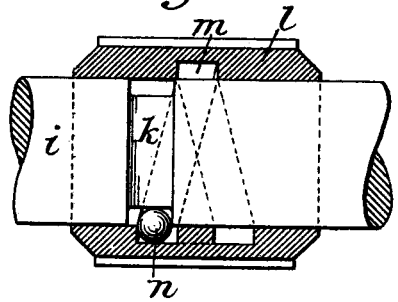
Figure 11:
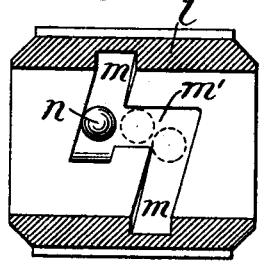
Figure 12:
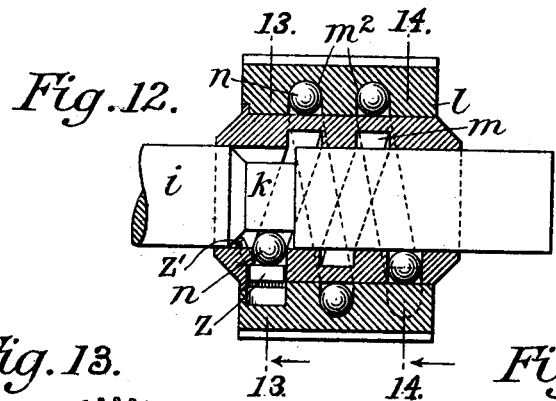
Figures 13, 14:
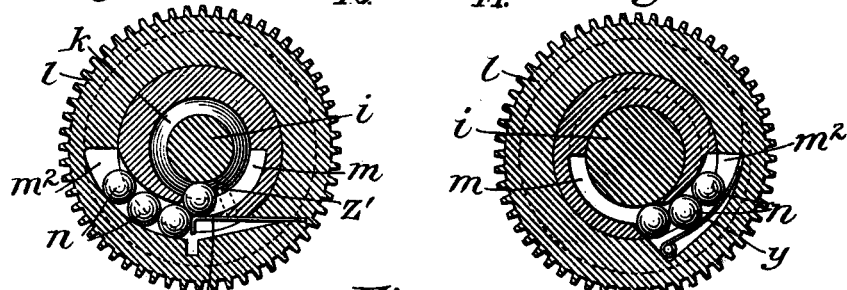
Figure 15:
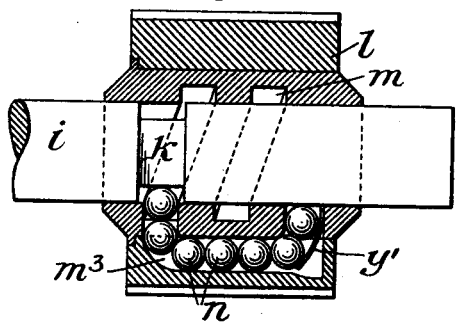
Figure 16:
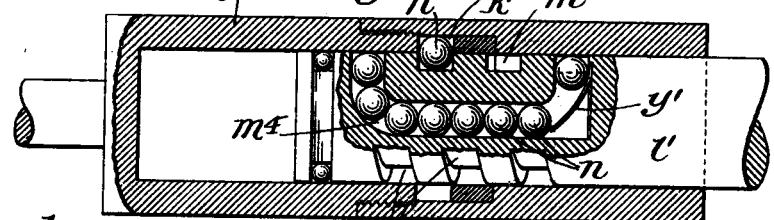

In the drawings, Figure 1 is a view, partly in longitudinal central section and partly in elevation, of a percussion-drill which embodies the invention. Figs. 2 and 3 are sections on the planes indicated by the lines 2 2 and 3 3, respectively, of Fig. 1. Fig. 4 is a detail section, on a larger scale, on the plane indicated by the line 4 4 of Fig. 1. Fig. 5 is a detail view of one of the pawls shown in Fig. 4. Fig. 6 is a detail view, in side elevation, of the shaft or sleeve engaged by the ratchet-ring shown in Fig. 4. Figs. 7 and 8 are sections on the plane indicated by the line 7 8 of Fig. 1, the parts being represented in the different figures in the positions which they assume at the beginning of the stroke and at the end of the stroke, respectively. Fig. 9 is a detail view in central longitudinal section, illustrating a slightly-different form of coupler or roller between the rotating part and the reciprocating part. Figs. 10 and 11 are detail views illustrating a further modification of the means for effecting the release of the coupler or roller from the spiral groove shown in the rotating part. Figs. 12, 13, and 14 are detail views in central longitudinal section and in transverse section, illustrating another arrangement of the rotating and reciprocating parts and the coupling devices. Figs. 15 and 16 are detail views illustrating other modifications of the means for effecting the coupling and the uncoupling or release of the rotating and reciprocating parts and of the relative arrangement of such parts.

The invention is illustrated in the drawings (see particularly Fig. 1) as embodied in a mine or quarry drill, and, as represented in said Fig. 1, those parts which support the working parts, hereinafter referred to more particularly, may be constructed and arranged in any usual or suitable manner. Thus a clamp $a$, fitting on the usual drill-carrying arm, may engage the base $b$, upon which is adjustably mounted, so that the drill can be set up to its work from time to time, the frame $c$, which carries the working parts. The frame $c$, as represented in said figure, may be engaged by an adjusting-screw $d$, which is carried by a plate $e$, having an eye and secured to retaining or guide strips $f$, which are bolted to the base $b$ and may be extended and bent upward at their ends to carry any suitable electric or other rotary motor $g$.

The working parts of the drill comprise a reciprocating part, which carries or is connected with the drill or other tool, a rotary part with suitable driving connections from the motor, one of said parts being formed with an inclined or spiral shoulder, and a free coupler in the nature of a ball or other roller of some form which operatively engages or connects the rotating part and the reciprocating part traveling on said inclined or spiral shoulder for the purpose of effecting the movement of the reciprocating part in one direction and is then caused to uncouple or disengage or disconnect the rotating part and the reciprocating part, so that the reciprocating part shall be released and permitted to move in the opposite direction under the influence of some suitable impelling force, such as gravity, a spring, air, steam, or gas under pressure, or some other force suited to the conditions of use. It will be obvious that the rotating part and the reciprocating part may be differently related to each other and that the spiral or inclined shoulder may be formed on one part or on the other, that the coupler may have any one of many different forms, and that the engagement of the coupler with and its disengagement from the spiral or inclined shoulder may be variously effected. Whatever form the rolling coupler may have it should be free to travel circumferentially with respect to both the rotating part and the reciprocatory part, both on account of the slight resistance offered and on account of the greater capacity of the mechanism to adapt itself to different conditions.

Some of the various practical embodiments of the invention referred to will now be described.

Referring first to the construction shown in Figs. 1 to 7, the drill or other tool $h$ is carried by a stem or shaft $i$, which is arranged to reciprocate in a suitable guide or bearing therefor formed in or carried by the frame $c$. At a suitable point the shaft is provided with a circumferential groove $k$ to form a shoulder. Mounted in suitable bearings in the frame and encircling the shaft $i$ is a sleeve $l$, which receives the shaft with a free fit, so that the shaft may reciprocate freely within the sleeve while the latter rotates freely about the shaft. The sleeve is provided with an inclined or spiral groove $m$ to form an inclined or spiral shoulder. The coupler, which, as already indicated, travels on the inclined or spiral shoulder of the one part, engaging the other part at the same time, so that one of such parts is moved longitudinally in one direction, but free to travel circumferentially with respect to said part, and then uncouples or releases or disengages the two parts, so that the longitudinally-movable part shall be permitted to move in the opposite direction under the influence of a suitable propelling force, is shown in this instance as a ball $n$, which during the movement of the reciprocating part in one direction is interposed between the shoulder formed by one side of the groove $k$ in the reciprocating part and the shoulder formed by the groove $m$ in the other or rotating part traveling on the inclined or spiral shoulder of the last-named part and being received partly in one groove and partly in the other. In order to effect the uncoupling of the rotating part and the reciprocating part or the release of the latter from the former, so that it may move under the influence of some suitable impelling force, the ball or other coupler $n$ is arranged to be disengaged from the inclined shoulder by retiring into the groove $k$, which is made deep enough to accommodate the whole of the coupler when it is so retired. As clearly shown in Fig. 8, the end of the groove $m$ runs off to nothing, so that as the ball or other coupler reaches such end, as represented by dotted lines, it is forced into the groove $k$ against the pressure of a flat coiled spring $o$, which is placed in the groove and serves to throw the ball or coupler out again into engagement with the rotating part, as shown in Fig. 7, as soon as the reciprocating part has completed its forward movement and is ready to begin again its backward movement. The spring also serves to press the ball into contact with the rotating part, so that the desirable rolling of the ball on the inclined shoulder shall be insured and the otherwise possible slipping of the ball with respect to the inclined shoulder prevented.

As a convenient means for rotating the part $l$, the same may be provided externally with gear-teeth to be engaged by a driving-pinion $p$, mounted in suitable bearings carried by the frame $c$. Said pinion is preferably connected with the motor $g$ through a friction-clutch of any suitable form in order that the motor may continue to run if, as sometimes happens, the drill or other tool becomes clogged and is held from movement. A convenient form of friction-clutch is illustrated in Fig. 1, comprising a sleeve $q$, secured to the shaft of the pinion and slotted longitudinally, as at $q'$, and encircled by a stiff spring-ring $r$. The end of the motor-shaft $g'$ is preferably flattened slightly and has a close fit within the sleeve, which is contracted about the shaft and caused to grasp the same tightly enough to drive the working parts of the machine under ordinary conditions by the pressure of the spring-ring upon the yielding portions of the sleeve between the slots. The pressure of the yielding portions of the sleeve on the shaft can be adjusted by slipping the ring more or less from the end of the sleeve, where it has no effect, toward the middle, where it has the greatest effect, by reason of the elasticity of the portions of the sleeve between the slots. It will be understood that the motor-shaft is connected with the rotating part of the motor by a spline and slot, so that it may move longitudinally through the motor as the drill is set up to its work, as already described. Gravity or any other suitable force may be used to effect the movement of the reciprocating part in the direction opposite to that of the movement effected by the inclined or spiral shoulder. In Fig. 1 of the drawings a spring $s$ is shown for this purpose, being confined between the end of the frame or casing $c$ and a shoulder on the shaft $i$. A cushion-plate $u$ may be secured to the end of the frame or casing $c$, as shown in Fig. 1, to hold in place the retaining-ring $u'$, and so cushion the shaft $i'$ when the drill or other tool does not strike the rock or other material operated upon.

As is well understood, a drill should receive a step-by-step rotation. To insure uniformity in such movement, in the present case the devices illustrated in Figs. 1, 3, 4, 5, and 6 have been provided. As there represented, the shaft $i$ or a sleeve $i'$, which for convenience in manufacture is threaded on a rearward extension of the shaft, but virtually forms a part thereof, is formed with inclined or spiral grooves $i^2$ of a large pitch. A ratchet-ring $v$, having lugs to enter the grooves $i^2$, as clearly shown in Fig. 4, is mounted loosely on the sleeve $i'$ and is held from longitudinal movement by any convenient means, as by a shoulder of the frame or casing and one of the bearings for the sleeve $l$, and is engaged by one or more pawls $x$, carried by the casing. It will be evident that as the shaft moves longitudinally in one direction it will be given a forward movement of rotation through the engagement of the spiral groove $i^2$ with the lugs of the ratchet-ring $v$, which is then held from backward rotation by the pawls $x$, and that during the longitudinal movement in the opposite direction no movement of rotation will be imparted to the shaft, since the ratchet-ring will turn freely under the pawls through the action of the spiral grooves $i^2$ on the lugs of the ratchet-ring.

It will be understood that the devices above referred to, which are not immediately concerned in effecting the reciprocation of the drill-shaft or tool-carrier, are shown and described herein for the purpose of illustrating and explaining the application of the devices for reciprocating the drill-shaft or other part in a machine of the particular character referred to and not as restrictions of such devices for reciprocating the drill-shaft or other part to the particular use referred to, although some of such auxiliary devices are particularly efficient for their intended purposes. The devices for reciprocating the drill-shaft are capable of considerable variation in the construction and arrangement of parts, and some of the practicable modifications will now be described.

As shown in Fig. 9, a cylindrical roller or disk $n'$ may be substituted as another form of roller for the ball $n$ (shown in Figs. 1, 7, and 8) as a coupler for the rotating part and the reciprocating part, the arrangement of said two parts being the same as shown in Fig. 1.

As another possible provision for the release of the reciprocating part after the completion of the backward movement, particularly in a construction where the spiral groove has a single complete turn, a return-channel $m'$ may be formed directly from one end of the spiral groove to the other, so that as soon as the ball or other coupler reaches the end of the spiral groove it will pass at once to the other end during the forward movement of the reciprocating part under the influence of the impelling force. (See Figs. 10 and 11.)

In the several forms already referred to a single ball or other coupler is provided; but in other forms a series of balls may be used, although but one ball at a time is in effective operation as a coupler. One of such forms is shown in Fig. 12, in which a return-channel or by-pass $m^2$ is formed through the sleeve from one end of the spiral groove $m$ to the other, such return-channel being shown in this instance as a spiral. A sufficient number of balls $n$ are employed to fill the by-pass or return-channel completely, so that as one ball enters the by-pass or channel, as shown in Fig. 14, it shall cause another ball to pass from the by-pass or return-channel, as shown in Fig. 13, into position for engagement with the rotating and the reciprocating part. A spring $y$ is secured in the entrance to the by-pass to assist in crowding the series of balls forward, and a spring $z$ is placed at the other end of the by-pass to release one ball at a time and insure its quick discharge from the return-channel. The spring $z$ is shown as provided with a pin $z'$, which projects through the sleeve and into the groove $k$ of the reciprocating part when the groove is in position to receive it at the end of the forward movement. When the reciprocating part begins its backward movement through being coupled with the rotating part by the ball which has already passed into engagement with the spiral groove $m$, the other edge of the groove $k$, which is chamfered off, makes contact with the pin $z'$ and thrusts the spring $z$ back, so as to release the next ball and permit it to be pushed forward into engagement with both grooves when the next forward movement is completed.

In the arrangement shown in Fig. 15 the by-pass or return-channel $m^3$ is substantially straight or parallel with the axis, this arrangement requiring a smaller number of balls. A spring $y'$ is also shown in this case to assist in crowding the balls forward in the return-channel.

It will be obvious that the relative arrangement of the reciprocating part and the rotating part heretofore referred to may be reversed, as indicated in Fig. 16, in which the reciprocating part or shaft has upon its end a sleeve $l^3$, which surrounds the rotating part $l'$, which in this instance is shown as a cylinder. The annular groove $k'$ is shown as formed in the interior of the sleeve and the spiral groove $m$ as formed on the exterior of the rotating part, while the return-channel $m^4$ is shown as formed through the rotating part. The operation of this construction is the same as that already described with reference to the other constructions and will be readily understood.

It will be noted that in the constructions shown in Figs. 12, 15, and 16 the spiral groove is represented as having two or more complete turns, and it will be understood that the extent of the inclined shoulder in each case will depend either upon the other features of the construction which may be employed in that particular case or upon the length of the stroke which it is desired that the reciprocating part shall have.

I claim as my invention—

1. In a machine of the character referred to, the combination of a tool shaft or carrier, a rotating part, one of said parts surrounding the other loosely to permit relative rotation and relative reciprocation, one of said parts having an inclined or spiral shoulder, a rolling coupler for said parts arranged to travel on said shoulder and engaging the other part to cause longitudinal movement of said tool shaft or carrier in one direction, but free to travel circumferentially with respect to the last-named part, provisions whereby the disengagement of said coupler from said shoulder at one end of the movement of the tool shaft or carrier and the engagement of said coupler with said shoulder at the other end of such movement are permitted and means to impel the tool shaft or carrier in a direction opposite to that of the movement effected by said shoulder when the coupler is released from said shoulder, substantially as shown and described.

2. In a machine of the character referred to, the combination of a tool shaft or carrier, a rotating part, one of said parts surrounding the other loosely to permit relative rotation and relative reciprocation, one of said parts having an inclined or spiral shoulder, a roller arranged to travel on said shoulder and engaging the other part to cause longitudinal movement of said tool shaft or carrier in one direction but free to travel circumferentially with respect to the last-named part, provisions whereby the disengagement of said roller from said shoulder at one end of the movement of the tool shaft or carrier and engagement of said coupler with said shoulder at the other end of such movement are permitted and means to impel the tool shaft or carrier in a direction opposite to that of the movement effected by said shoulder when the roller is released from said shoulder, substantially as shown and described.

3. In a machine of the character referred to, the combination of a tool shaft or carrier, a rotating part, one of said parts surrounding the other loosely to permit relative rotation and relative reciprocation, one of said parts having an inclined or spiral shoulder, a roller arranged to travel on said shoulder and engaging the other part to cause longitudinal movement of said tool shaft or carrier in one direction but free to travel circumferentially with respect to the last-named part, means to move said roller into and out of engagement at opposite ends of the movement of the tool shaft or carrier, and means to impel the tool shaft or holder in a direction opposite to that of the movement effected by said shoulder when the roller is released from said shoulder, substantially as shown and described.

4. In a machine of the character referred to, the combination of a tool shaft or carrier, a rotating part, one of said parts surrounding the other loosely to permit relative rotation and relative reciprocation, one of said parts having an inclined or spiral shoulder, a roller arranged to travel on said shoulder and engaging the other part to cause longitudinal movement of said tool shaft or carrier in one direction, but free to travel circumferentially with respect to the last-named part, and one of said parts having a chamber or channel adapted to receive said roller and permit the disengagement thereof from said shoulder, means to cause said roller to move into said chamber or channel at one end of the movement of the tool shaft or carrier and to move said roller again into engagement with said shoulder at the other end of such movement, and means to impel the tool shaft or carrier in a direction opposite to that of the movement effected by said shoulder when the roller is disengaged from said shoulder, substantially as shown and described.

5. In a machine of the character referred to, the combination of a tool shaft or carrier, a rotating part, one of said parts surrounding the other loosely to permit relative rotation and relative reciprocation, one of said parts having an inclined or spiral shoulder and the other of said parts having a circumferential shoulder, a roller arranged to travel on said inclined or spiral shoulder and engaging said circumferential shoulder to cause longitudinal movement of said tool shaft or carrier in one direction but free to travel circumferentially with respect to the last-named part, provisions whereby the disengagement of said roller from said inclined or spiral shoulder at one end of the movement of the tool shaft or carrier and the engagement of said coupler with said inclined or spiral shoulder at the other end of such movement are permitted, and means to impel the tool shaft or carrier in a direction opposite to that of the movement effected by said inclined or spiral shoulder when the roller is released from said shoulder, substantially as shown and described.

6. In a machine of the character referred to, the combination of a tool shaft or carrier, a rotating part, one of said parts surrounding the other loosely to permit relative rotation and relative reciprocation, one of said parts having a spiral groove and the other of said parts having a circumferential groove, a roller arranged to travel in said spiral groove and to engage said circumferential groove, a spring arranged in said circumferential groove to press the roller into said spiral groove, said circumferential groove having a sufficient depth to receive said roller wholly and said spiral groove being reduced at its end to press the roller into said circumferential groove against the spring, and means to impel the tool shaft or carrier in a direction opposite to that of the movement effected by said shoulder when the roller is pressed wholly into said circumferential groove, substantially as shown and described.

7. In a machine of the character referred to, the combination of a tool shaft or carrier, a rotating part, one of said parts surrounding the other loosely to permit relative rotation and relative reciprocation, one of said parts having an inclined or spiral shoulder, a rolling coupler for said parts arranged to travel on said shoulder and engaging the other part to cause longitudinal movement of said tool shaft or carrier in one direction, provisions whereby the disengagement of said coupler from said shoulder at one end of the movement of the tool shaft or carrier and the engagement of said coupler with said shoulder at the other end of such movement are permitted, means to impel the tool shaft or carrier in a direction opposite to that of the movement effected by said inclined or spiral shoulder when the coupler is released from said shoulder, a motor for said rotating part, and a friction-clutch interposed between said motor and said rotating part, substantially as shown and described.

8. In a machine of the character referred to, the combination of a tool shaft or carrier, a rotating part, one of said parts surrounding the other loosely to permit relative rotation and relative reciprocation, one of said parts having an inclined or spiral shoulder, a coupler for said parts arranged to travel on said shoulder and engaging the other part to cause longitudinal movement of said tool shaft or carrier in one direction, provisions whereby the disengagement of said coupler from said shoulder at one end of the movement of the tool shaft or carrier and the engagement of said coupler with said shoulder at the other end of such movement are permitted, means to impel the tool shaft or carrier in a direction opposite to that of the movement effected by said inclined or spiral shoulder when the roller is released from said shoulder, a frame to carry all of said parts, a base upon which said frame is adjustably mounted, a motor carried by said base, and connections between said motor and said rotating part including a sliding shaft, substantially as shown and described.

9. In a machine of the character referred to, the combination of a tool shaft or carrier, a rotating part, one of said parts surrounding the other loosely to permit relative rotation and relative reciprocation, one of said parts having an inclined or spiral shoulder, a rolling coupler for said parts arranged to travel on said shoulder and engaging the other part to cause longitudinal movement of said tool shaft or carrier in one direction, provisions whereby the disengagement of said coupler from said shoulder at one end of the movement of the tool shaft or carrier and the engagement of said coupler with said shoulder at the other end of such movement are permitted, means to impel the tool shaft or carrier in a direction opposite to that of the movement effected by said inclined or spiral shoulder when the coupler is released from said shoulder, and means to rotate the said tool shaft or carrier with a step-by-step movement as it is reciprocated, substantially as shown and described.

10. In a machine of the character referred to, the combination of a tool shaft or carrier, a rotating part, one of said parts surrounding the other loosely to permit relative rotation and relative reciprocation, one of said parts having an inclined shoulder and the other of the parts having a circumferential groove, a roller arranged to travel in contact with said shoulder and to engage said circumferential groove, a spring arranged to press the roller into contact with the rotating part, provisions whereby the disengagement of said roller from said shoulder at one end of the movement of the tool shaft or carrier and the engagement of said roller with said shoulder at the other end of such movement are permitted, and means to impel the tool shaft or carrier in a direction opposite to that of the movement effected by said shoulder when the roller is released from said shoulder, substantially as shown and described.

11. In a machine of the character referred to, the combination of a frame, a tool shaft or carrier mounted to reciprocate in said frame, a base upon which said frame is adjustable in the direction of the reciprocation of the tool-carrier, a rotary motor mounted upon said base with its axis extending in the direction of reciprocation of the tool-carrier and having a hollow shaft, a shaft engaging and adapted to slide in said hollow shaft, and gearing intermediate said sliding shaft and tool-carrier whereby the reciprocation of the latter is effected, substantially as shown and described.

This specification signed and witnessed this 9th day of February, A. D. 1900.

BRADFORD H. LOCKE.

In presence of—
ANTHONY N. JESBERA,
WILLIAM B. GREELEY.